(12) United States Patent
Afghahi (10) Patent No.: US 6,747,695 B1
(45) Date of Patent: Jun. 8, 2004

(54) INTEGRATED CMOS IMAGER

(75) Inventor: Morteza Afghahi, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/985,838

(22) Filed: Dec. 5, 1997

(51) Int. Cl.[7] ............................................. H04N 5/217
(52) U.S. Cl. ..................................................... 348/241
(58) Field of Search ................................ 348/302, 303, 348/304, 305, 306, 307, 308, 241, 243, 296, 294; 378/98.8, 98.1, 98.2, 98.12; 250/208.1

(56) References Cited

U.S. PATENT DOCUMENTS

| 4,945,418 A | * | 7/1990 | Mutoh | 348/308 |
| 5,038,369 A | * | 8/1991 | Nishiki | 378/98.12 |
| 5,345,111 A | * | 9/1994 | Fong | 327/51 |
| 5,434,619 A | * | 7/1995 | Yonemoto | 348/241 |
| 5,534,864 A | * | 7/1996 | Ono et al. | 341/156 |
| 5,633,679 A | * | 5/1997 | Hosier et al. | 348/243 |
| 5,748,303 A | * | 5/1998 | Korta et al. | 356/229 |
| 5,923,370 A | * | 7/1999 | Miethig et al. | 348/243 |
| 6,072,527 A | * | 6/2000 | Iwai | 348/243 |
| 6,304,292 B1 | * | 10/2001 | Ide et al. | 348/243 |

* cited by examiner

Primary Examiner—Andrew Christensen
Assistant Examiner—Rashawn N. Tillery
(74) Attorney, Agent, or Firm—Seth Z. Kalson (57) ABSTRACT

An integrated CMOS image sensor comprising pixel rows integrated on a substrate, each pixel row having pixel circuits, each pixel circuit providing a voltage signal in response to absorbed photons; and an opaque layer deposited above the pixel rows to define a set of dark pixels for each pixel row. For each pixel row, dark voltage signals indicative of the voltage signals provided by the set of dark pixels are stored and used to dark correct the voltage signals from the other pixels. The image sensor also comprises voltage-to-current converters for converting the voltage signals to currents for all pixel columns for each frame and followers to reduce the voltage swings on the outputs of the voltage-to-current converters. The currents are multiplexed in serial fashion to a current-to-voltage converter. The output of the current-to-voltage converter provides the dark voltage signals.

9 Claims, 7 Drawing Sheets

INTEGRATED CMOS IMAGER

FIELD OF INVENTION

The present invention relates to image sensors, and more particularly to integrated CMOS image sensors with dark voltage correction.

BACKGROUND

In a CMOS imager, an image is focused upon an array of active pixels, where each active pixel provides an analog voltage signal indicative of a time integration of the intensity of light impinging upon a pixel diode. The time integration is determined by the frame rate, where the entire pixel array is read during each frame. Competing factors in choosing a frame rate are that a frame rate must be chosen fast enough so that images are reasonably clear (due to subject motion) but slow enough so that there are a sufficient number of photons to be detected by the pixel arrays. The analog voltages provided by the CMOS imager are processed and eventually digitized for use by computer systems, digital storage devices, or perhaps processed further by digital processing methods.

As frame rates increase, there is more of a burden placed upon signal processing circuits, and the analog-to-digital conversion performed to digitize the image may result in a bottleneck. This bottleneck can be reduced by utilizing a plurality of analog-to-digital converters (ADC). For example, an ADC can be dedicated to each column of pixels within the pixel array. However, to increase reliability, reduce manufacturing costs, and decrease power consumption, it is desirable to integrate the image sensor and its accompanying signal processing circuitry, including any ADCs, onto a single die. Employing a large plurality of ADCs would therefore make full integration more difficult. Therefore, it would be advantageous to structure the analog signal processing in such a way that only one or very few ADCs are needed to support high frame rates.

CMOS image sensors are affected by dark voltage. Dark voltage in a CMOS pixel results from dark current in the pixel diode caused by the leakage current in the pixel diode. Dark current increases with temperature, and hence the term dark voltage. Dark current acts like photon induced current and creates an error voltage in the pixel which is referred to as the dark voltage. Unless corrected, dark voltage causes the final image processed from the imager to appear with a brighter background than it should have. Dark current phenomenon not only increases the floor noise, it also hides darker points in the images.

To reduce the effects of dark voltage, prior art image sensors use a mechanical shutter to read the pixel array voltages when the shutter is closed, thus providing an array of dark voltages which are subtracted from the pixel array voltages when the shutter is opened to capture an image. This method requires substantial storage to store the array of dark voltages, and also reduces the effective frame rate because image frames are lost when the shutter is closed. Therefore, it would be advantageous to compensate for the dark voltages within the pixel array voltages without needing extra storage and without reducing the effective frame rate.

DETAILED DESCRIPTION OF EMBODIMENTS

Figure 1:
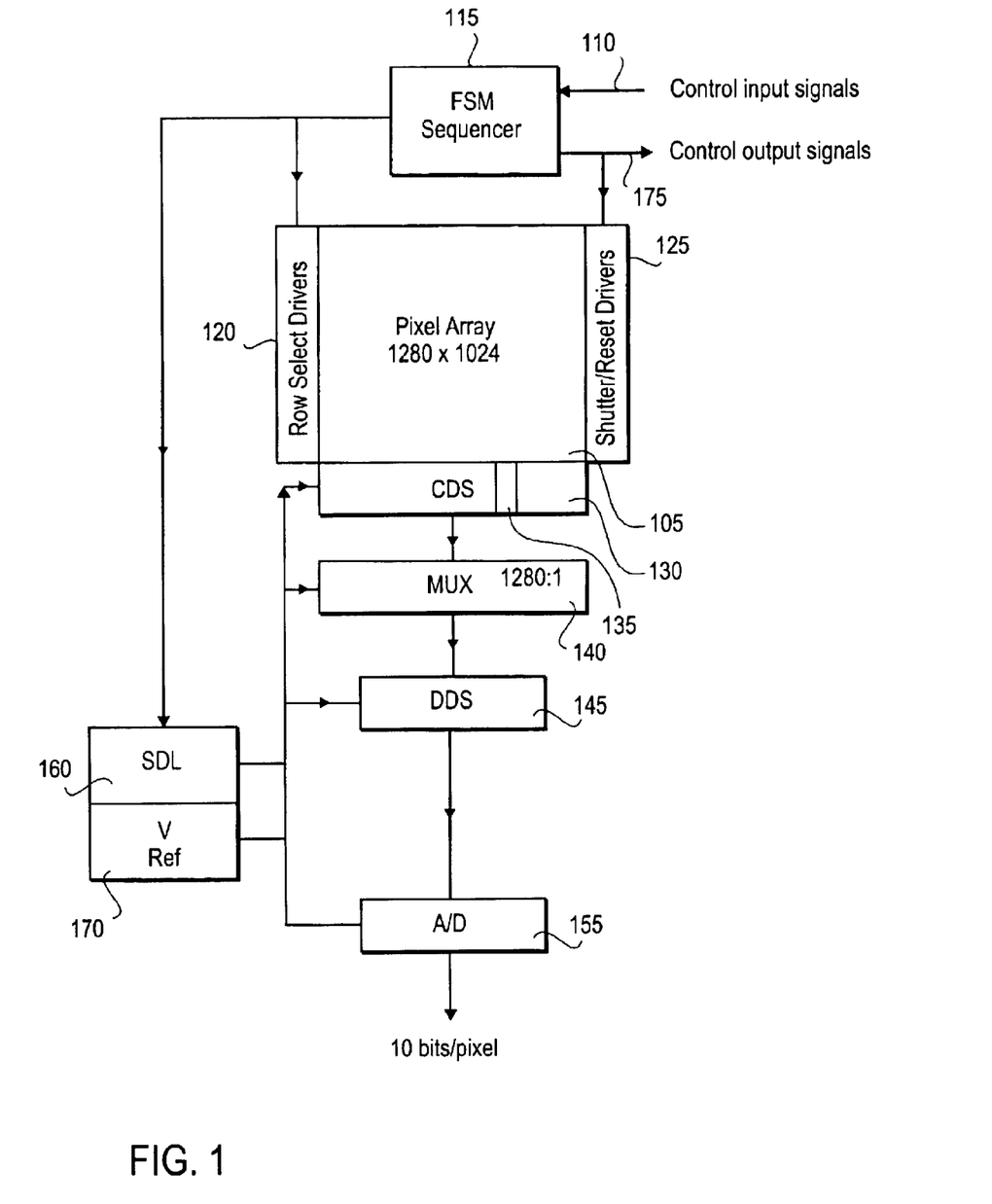
FIG. 1 is a high-level diagram of the architecture of an exemplary image sensor.

FIG. 1 illustrates a high-level diagram of an integrated imager. Most of the functional blocks illustrated in FIG. 1 will be described in more detail in reference to subsequent figures. Pixel array (or pixel focal plane) 105 comprises an array of active pixels, where each pixel provides a pixel voltage indicative of a time integration of the intensity of light incident upon the pixel. Not shown in FIG. 1 are optics required to focus an image upon pixel array 105. In one embodiment, pixel array 105 is composed of 1280 rows of pixels, where each row of pixels has 1024 pixels (or pixel columns). The time integration for each pixel is determined by the frame rate, which may be provided by a control input signal on line 110 to sequencer 115. Sequencer 115 is a finite state machine sequencer for providing control signals to the various functional blocks illustrated in FIG. 1.

Row select drivers 120 provide signals, under control of sequencer 115, to select an entire row of pixels within pixel array 10 for reading. Sample and reset drivers 125 provide reset and shutter voltage signals to the pixel row selected by row select drivers 120 under control of sequencer 115. The reset and shutter voltage signals are used in combination so that each pixel can provide two voltage signals; a sample voltage signal representing a pixel voltage after some integration time, and a calibration voltage signal for calibrating the sample voltage signal and for reducing inter-pixel mismatch.

It is to be understood that the pixel circuits making up any given row of pixels need not necessarily be co-linear, nor uniformly spaced. In general, a "row" of pixels (or pixel row) is to be understood as that group of pixel circuits controlled by a single row signal. A pixel circuit in a pixel row is connected to only one column line to provide on the column line the sample voltage signals and the calibration voltage signals.

Not all pixel circuits in a pixel need to be connected to a column line. As discussed later for one embodiment, for each pixel row a plurality of pixel circuits are kept dark but only one pixel circuit for each pixel row is used for providing a dark voltage. (We refer to the sample and calibration voltage signals as dark sample and dark calibration voltage signals, respectively, when the pixel circuit or circuits providing these signals is kept dark. When no distinction needs to be made, we refer to both dark sample and dark calibration voltage signals as a dark voltage signal.) The pixel circuits that provide the dark voltages must be connected to column lines (perhaps the same column line), but the other dark pixel circuits not used to provide a dark voltage need not be connected to a column line.

The sample and calibration voltage signals are provided to correlated double sampler (CDS) 130. CDS 130 is comprised of a row of CDS cells 135, one CDS cell for each pixel column within pixel array 105. CDS 130 performs a sample and hold function on the output voltages from the pixel columns, and provides voltage-to-current conversion of these pixel column voltages. The pixel column voltages are provided to CDS 130 in parallel. That is, to read a frame, pixel column voltages are transferred to CDS 130 one row at a time until all pixel sample and calibration voltage signals have been transferred to CDS 130 for a given frame.

MUX 140 is a multiplexer switch, or switching tree, and selects CDS cells 135 one by one and transfers their output signals serially to double delta sampler (DDS) 145 at one pixel per clock cycle. The first stage of DDS 145 performs current-to-voltage conversion to provide voltage signals proportional to the sample and calibration voltage signals, and without loss of generality and for simplicity we refer to these voltage signals as the sample and calibration signals even though they are proportional to but not equal to the original sample and calibration signals provided to CDS 130. The other stages of DDS 145 process the sample and calibration voltage signals to obtain voltage signals accurately representing the image focused upon pixel array 105. DDS 145 performs programmable gain and dark voltage correction. In this architecture we correct for average dark current.

The signals processed by pixel array 105, CDS 130, MUX 140, and DDS 145 are analog signals. The analog voltage signals provided by DDS 145 are converted into digital format by analog-to-digital converter (ADC) 155. In one embodiment, components 105, 120, 125, 130, 140, 145, and 155 are all integrated on one die to form an integrated CMOS sensor. In one embodiment, ADC 155 provides 10 bits per pixel. ADC 155 is a pipelined converter with digital error correction that takes differential input signals and converts them to 10 digits in a string of analog signal processing stages. There is more than one analog signal in the "pipe" at any point in time. ADC 155 also has a digital block at the end that realigns the digital result. The digital result is delayed in time from the analog input. The pixel data that is finally output to the digital pins is actually from the pixel clock that was 7 cycles before. This is corrected by sequencer 115 that provides a "data valid" signal to the controller via output line 175. Some of the functional blocks in FIG. 1 are now discussed in more detail.

Figure 2:
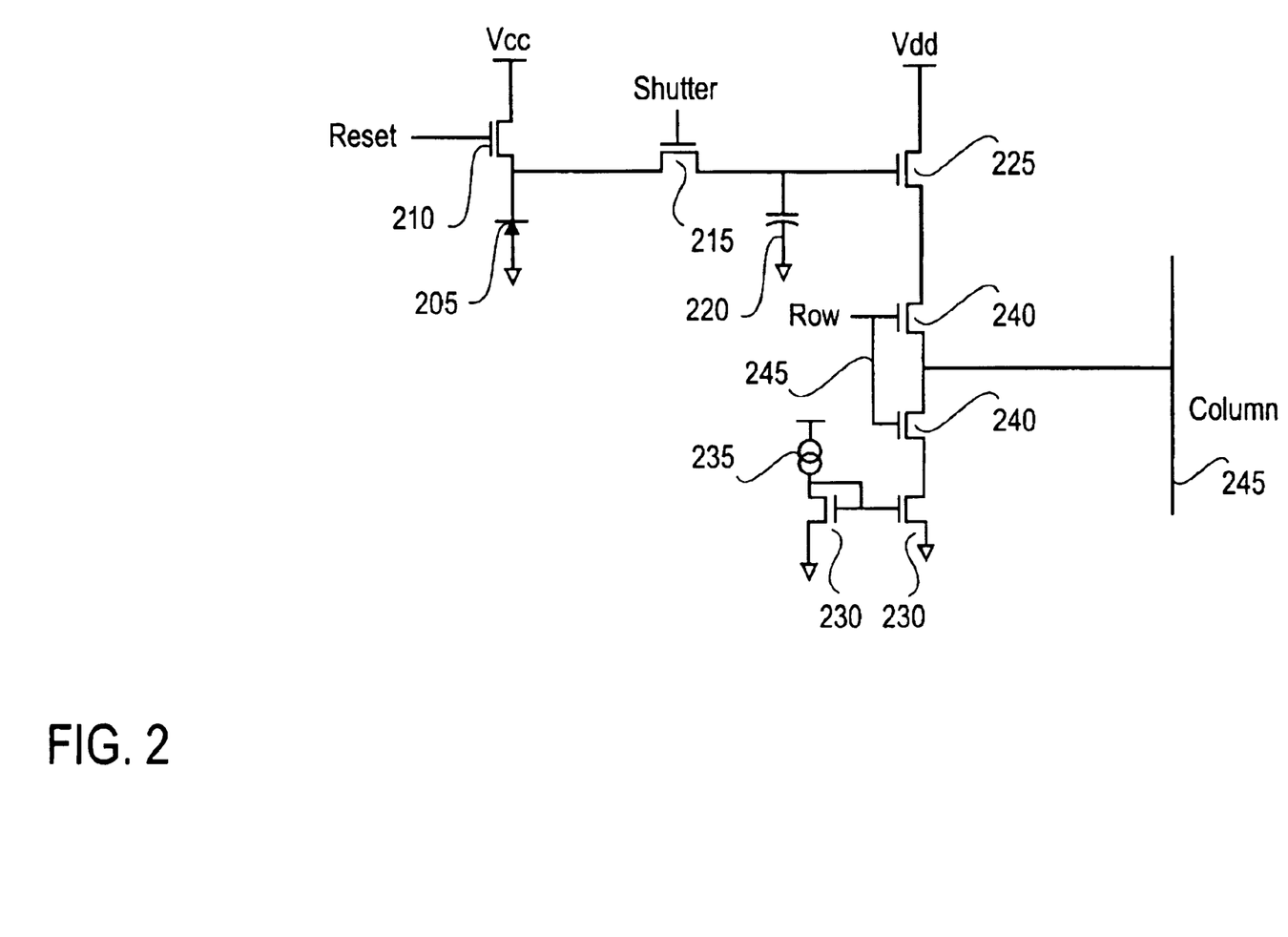
FIG. 2 is a circuit diagram of an exemplary pixel circuit.

FIG. 2 illustrates an active pixel comprising pixel diode 205 and associated circuitry. Photons captured by diode 205 are measured in the following way. A reset voltage signal goes HIGH to switch nMOSFET ON so that diode 205 is reverse biased to a reverse bias voltage $V_{cc}$. This creates a wide depletion layer within diode 205. While reset voltage signal is HIGH, a shutter voltage signal also is set HIGH to switch nMOSFET 215 ON so that capacitor 220 is charged to the reverse bias voltage of diode 205. When diode 205 is impacted by a photon with sufficient energy, the photon generates an electron-hole pair. If the reset voltage signal is brought LOW so that nMOSFET 210 is OFF but the shutter voltage signal is still HIGH, then the electron-hole pairs generated by the photons captured in diode 205 discharge diode's 205 parasitic capacitance, reducing diode's 205 reverse bias voltage and similarly reducing the voltage stored on capacitor 220. The length of time for which the shutter voltage signal is HIGH and the reset voltage signal is LOW determines the integration time. In one embodiment, diode 205 is initially biased to approximately 5 volts.

Figure 3:
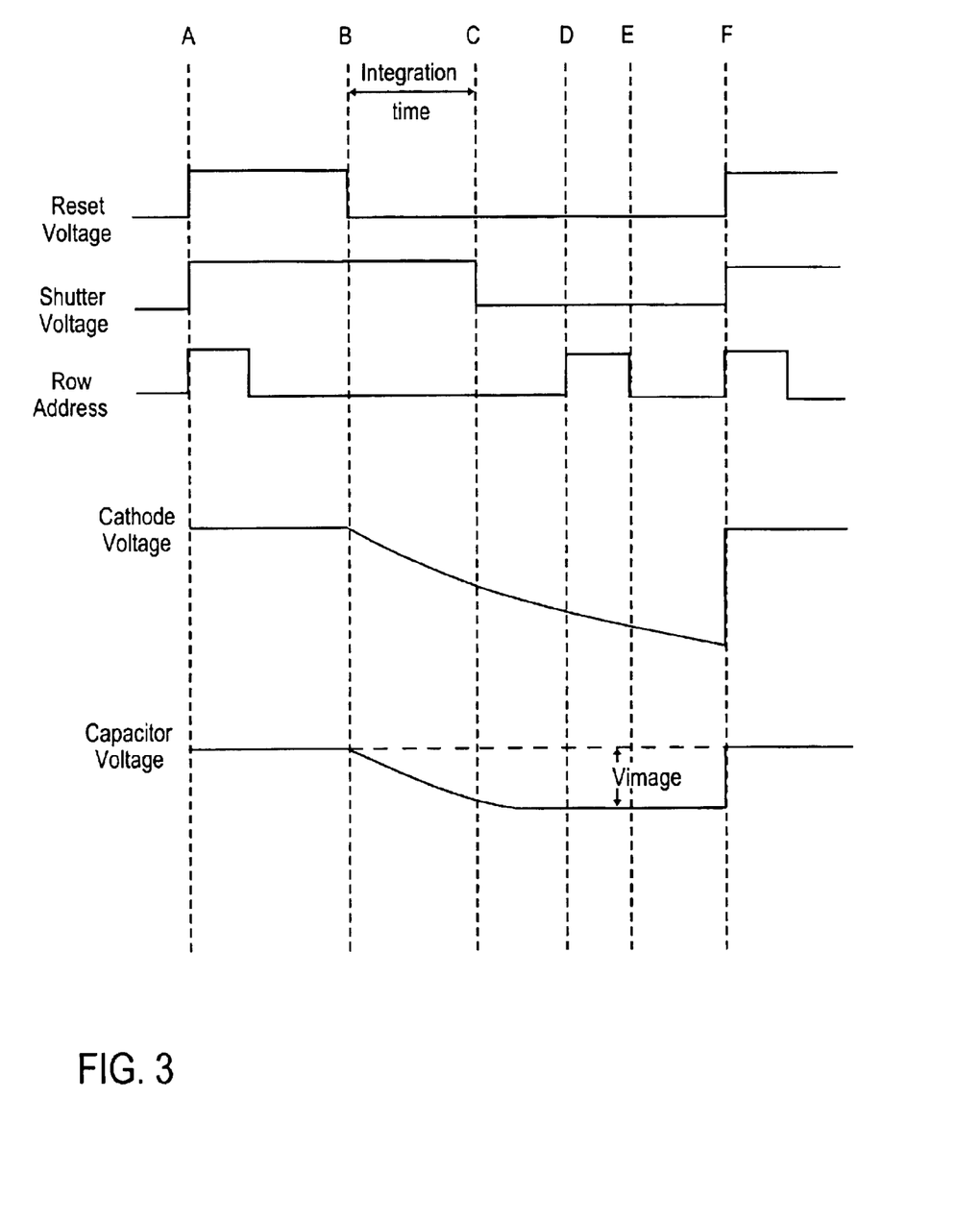
FIG. 3 illustrates an exemplary timing diagram for control signals and voltages for an exemplary pixel diode and capacitor.

FIG. 3 illustrates various signals related to FIG. 2. In FIG. 3, the reset and shutter voltage signals are HIGH during time segment A-B, whereas the reset voltage signal is OFF during time segment B-C but the shutter voltage signal is HIGH. Time segment B-C represents the integration time. During the integration time, the voltage at the cathode of diode 205 and the voltage of capacitor 220 are decaying due to the generation of electron-hole pairs. After the shutter voltage signal goes LOW at time C, the cathode voltage of diode 205 continues to decay, but the voltage of capacitor 220 stays approximately constant. The voltage difference denoted by $V_{image}$ in FIG. 3, which is the difference between the initial and final voltage of capacitor 220, represents the time integration of the intensity of light captured by pixel diode 205 during a frame time.

To determine $V_{image}$, the voltage of capacitor 220 needs to be read when diode 205 is fully reverse biased (when the reset voltage signal is HIGH) and when the shutter voltage signal returns LOW. The voltage of capacitor 220 is read at the source of nMOSFET 225, where nMOSFET 225, current mirror nMOSFETs 230, and current source 235 comprise a follower. The source voltage of nMOSFET 225 is read by switching a row address voltage signal HIGH so that nMOSFETs 240 are ON. If column line is properly discharged before the row address voltage signal is HIGH, then the voltage on column line 245 is to within a threshold voltage drop of the voltage of capacitor 220. Not shown in FIG. 2 are other column pixels coupled to column line 245 and identical in structure to that shown in FIG. 2.

The row address voltage signal is shown in FIG. 3. By setting the row address voltage signal HIGH during the time segment A-B, the source voltage of nMOSFET 225 is read when capacitor 220 is fully charged, and by setting the row address voltage signal HIGH during the time segment C-F (but not at time F) the source voltage of nMOSFET 225 is read when capacitor 220 is discharged after the integration time. The former and latter read source voltages are what we have referred to earlier as the calibration and sample voltage signals, respectively. If dark voltage was not present, then $V_{image}$ would be an accurate representation of the time integration of the light intensity incident upon pixel diode 205. Subtracting the sample voltage signal from the calibration voltage signal compensates for pixel-to-pixel variation, such as differences in threshold voltages for the source follower transistors (nMOSFET 225).

The integration time is programmable and the reset, shutter, and row address voltage signals are provided by synchronous delay line (SDL) 160 of FIG. 1. In one embodiment, the shutter and reset voltage signals are at $1.5V_{cc}$ when HIGH. This compensates for the voltage threshold plus body effect voltage drop of these two transistors. In one particular embodiment, the shutter and reset voltage signals are at 7.5 volts when HIGH. Also, after the row address voltage signal is set HIGH to read the source voltage of nMOSFET 225 when the shutter voltage signal is LOW (time segment D-E), the reset voltage signal should be pulsed HIGH quickly to prevent the anode of diode 205 from going below ground, which can cause image blooming by affecting adjacent pixel diodes via the substrate well.

After the pixel voltages have been gated by the shutter voltage signal to the follower transistors for the entire pixel array 105, then the pixel rows are read into CDS 130 one at a time via their row address signals. When the row select is switched ON, the pixel value that was stored on the follower is transferred to the column. When the row select signal is activated all the pixel signal values in that row are transferred to CDS 130.

During read-out, the image is transferred to CDS 130 one row at a time, therefore row address lines 245 are driven by row select drivers 120 to access one pixel row at a time. Before a row select line is activated, the charge on column lines 245 is discharged by CDS 130. The shutter, reset, and row address voltage signals are controlled for a pixel row, as discussed in relation to FIG. 3, to transfer the sample and calibration voltage signals to CDS 130, where each CDS cell 135 is connected to a column line.

Figure 4:
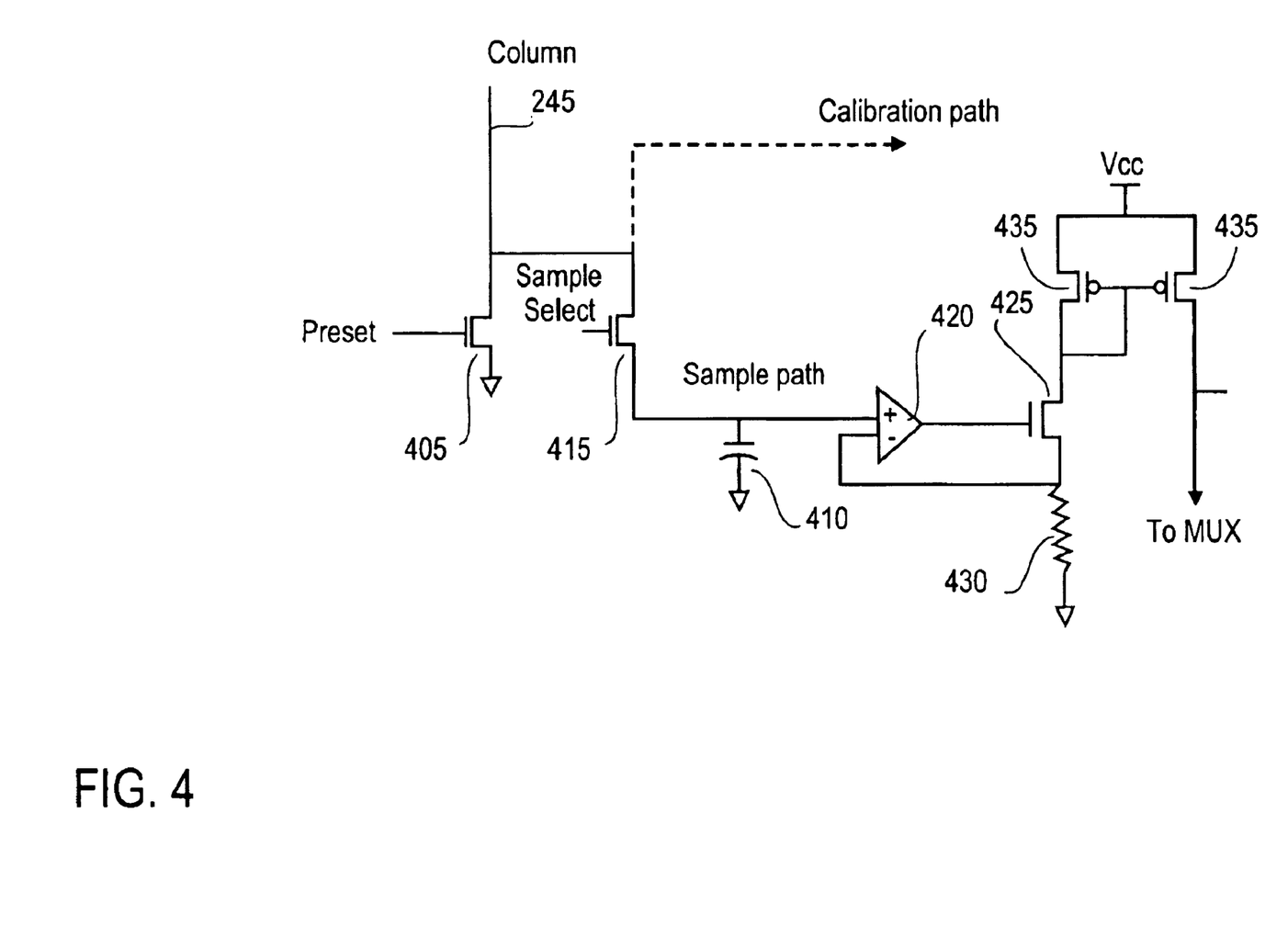
FIG. 4 is a circuit diagram of an exemplary correlated double sampler circuit.

Each CDS cell 135 contains two paths; a "calibration path" for the calibration voltage signal and a "sample path" for the sample voltage signal. FIG. 4 shows an embodiment of a CDS cell 135 showing the sample path in solid lines. The calibration path is identical to the sample path and is partially indicated by the dotted lines. A preset voltage signal is set HIGH to switch nMOSFET 405 ON so as to discharge column line 245. A sample select voltage signal is set HIGH to switch nMOSFET 415 ON. With nMOSFETs 405 and 415 both ON, capacitor 410 is discharged. With nMOSFET 405 OFF and nMOSFET 415 ON, capacitor 410 charges up to the source voltage of follower nMOSFET 225. Since all the pixel columns are read at the same time, the preset and sample select voltage signals are common to all CDS cells. When the preset voltage signal is LOW and the sample select voltage signal is HIGH, the row address voltage signal for the desired pixel row is set HIGH as indicated in time segment D-E shown in FIG. 3. This transfers the sample voltage signal stored on capacitors 220 (to within one voltage threshold) for the selected pixel row to capacitors 410 in the CDS cells. The sample select voltage signal is then set LOW to switch nMOSFET 415 OFF. Similar steps are performed with respect to the calibration path to transfer the calibration voltage signal to the CDS cells.

Continuing with a description of the sample path, Op-Amp 420 drives the gate of nMOSFET 425 so that its source is at the same potential as capacitor 410. This causes a current that is directly proportional to the sample voltage signal (to within a threshold voltage) to pass through resistor 430. Transistors nMOSFETs 435 mirror this current to DDS 145 via MUX 140 when selected by MUX 140. The current mirror comprised of nMOSFETs 435 actually multiplies the current so that MUX 140 can operate at a high frequency. The output provided by pMOSFET 435, and its counterpart in the calibration path (not shown), may be termed, respectively, the sample current signal and the calibration current signal.

Resistors 430 for each CDS cell should be matched to each other, and each Op-Amp 420 should have low offset. Resistors 430 for each CDS cell are matched by inter-digitating, and the offsets for Op-Amp 420 of each CDS cell is controlled by common centroiding the layout and making the Op-Amp transistors as large as allowable by the column pitch. In order to make the Op-Amp transistors as large as possible, the CDS cells were actually laid out at twice the pixel width and then stacked so that there are actually four Op-Amps in each layout instance.

Figure 5:
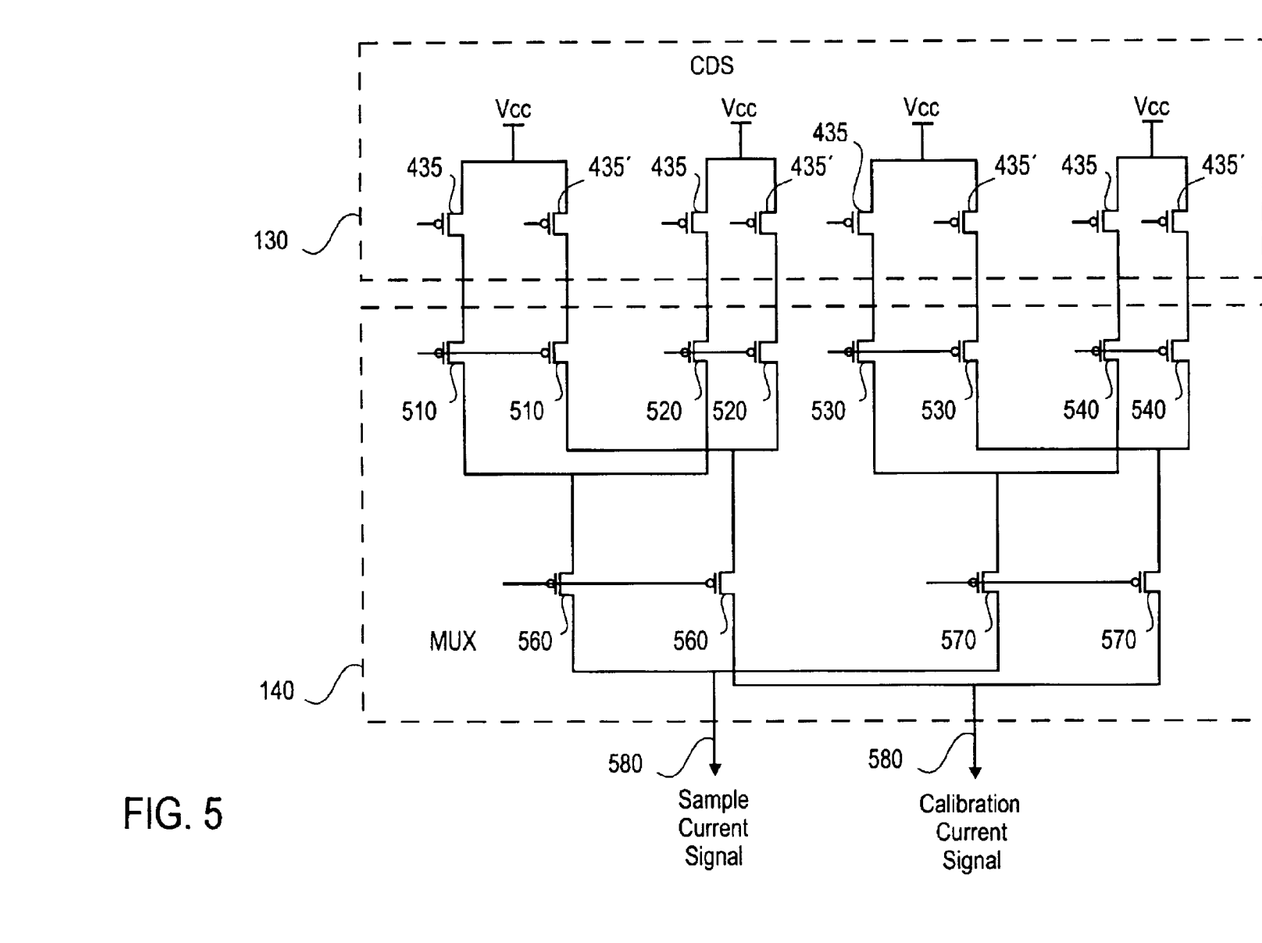
FIG. 5 is a circuit diagram of an exemplary multiplexer for four pixel columns.

MUX 140 switches the output from each CDS cell 135 to DDS 145 so as to provide the sample current signal and calibration current signal from CDS 130 serially to DDS 145. MUX 140 may be any multiplexer. In one embodiment, MUX 140 may be implemented as a tree architecture. An example of a 4:1 tree for a 4 column pixel array is shown in FIG. 5, where pMOSFETs 435' are counterparts to pMOS-FETs 435 in the calibration path. The pMOSFETs 510–570 may be controlled by SDL 160, or by additional timing circuits. For example, with pMOSFETs 520 and 560 ON and all other pMOSFETs within MUX 140 OFF, the sample and calibration current signals for the second CDS cell (or second column) is provided at outputs 580. For the embodiment in FIG. 1, MUX 140 is a 1280:1 multiplexer. Outputs 580 are connected to DDS 145.

Figure 6:
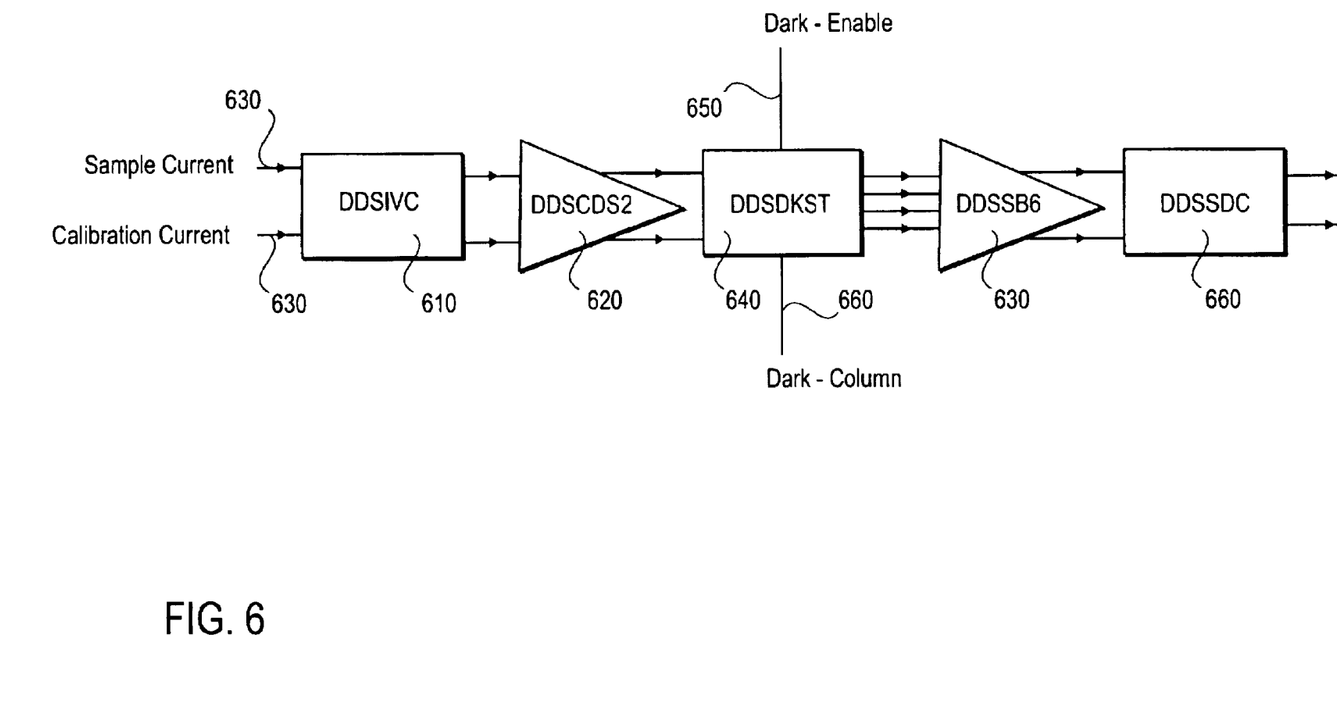
FIG. 6 is a high-level diagram of an exemplary double delta sampler circuit.

In one embodiment, DDS 145 performs current-to-voltage conversion, level shift and first stage gain, dark voltage sample and hold, dark voltage subtraction and second stage gain, and finally single to differential conversion. The functional blocks of one embodiment of DDS 145 are illustrated in FIG. 6.

Functional block DDSIVC 610 provides the function of current-to-voltage conversion, receiving the sample and calibration current signals and providing new sample and calibration voltage signals proportional, respectively, to the sample and calibration current signals. When the context is clear, we make no distinction between the new and original sample and calibration voltage signals. DDSIVE 610 buffers the sample and calibration voltage signals to drive the next stage, DDSCDS2 620.

Each of the currents entering into DDSIVC 610 pass through the source-drain of a pMOSFET configured as a follower to maintain approximately a constant voltage on the current data lines 630. This helps to increase data rate, for the data rate of the analog signal paths are limited by the design of MUX 140 and DDSIVC 610. The data rate of the analog signal paths are slowed down because the analog signal paths need to swing the current node voltage. In a voltage mode application, the nodes would have to change as much as the analog data, meaning that if the data range was three volts then the nodes would need to swing by three volts. The capacitance on these nodes is very large, even though the column select transistors in the previous stages (CDS 130 and MUX 140) are small. Therefore, the settling times would be too long in a voltage mode configuration, unless a large driver could be designed for each column. In preferred embodiments, data transfer is instead done in a current mode rather than a voltage mode to relieve this problem, thus resulting in a faster data transfer rate. In theory, if the node voltage didn't change, then the operating frequency would be unlimited. However, in practice for one embodiment, the actual node voltage varies by approximately 300 mV. For one embodiment, this phenomenon sets the maximum settling frequency at about 12 MHz.

Figure 7:
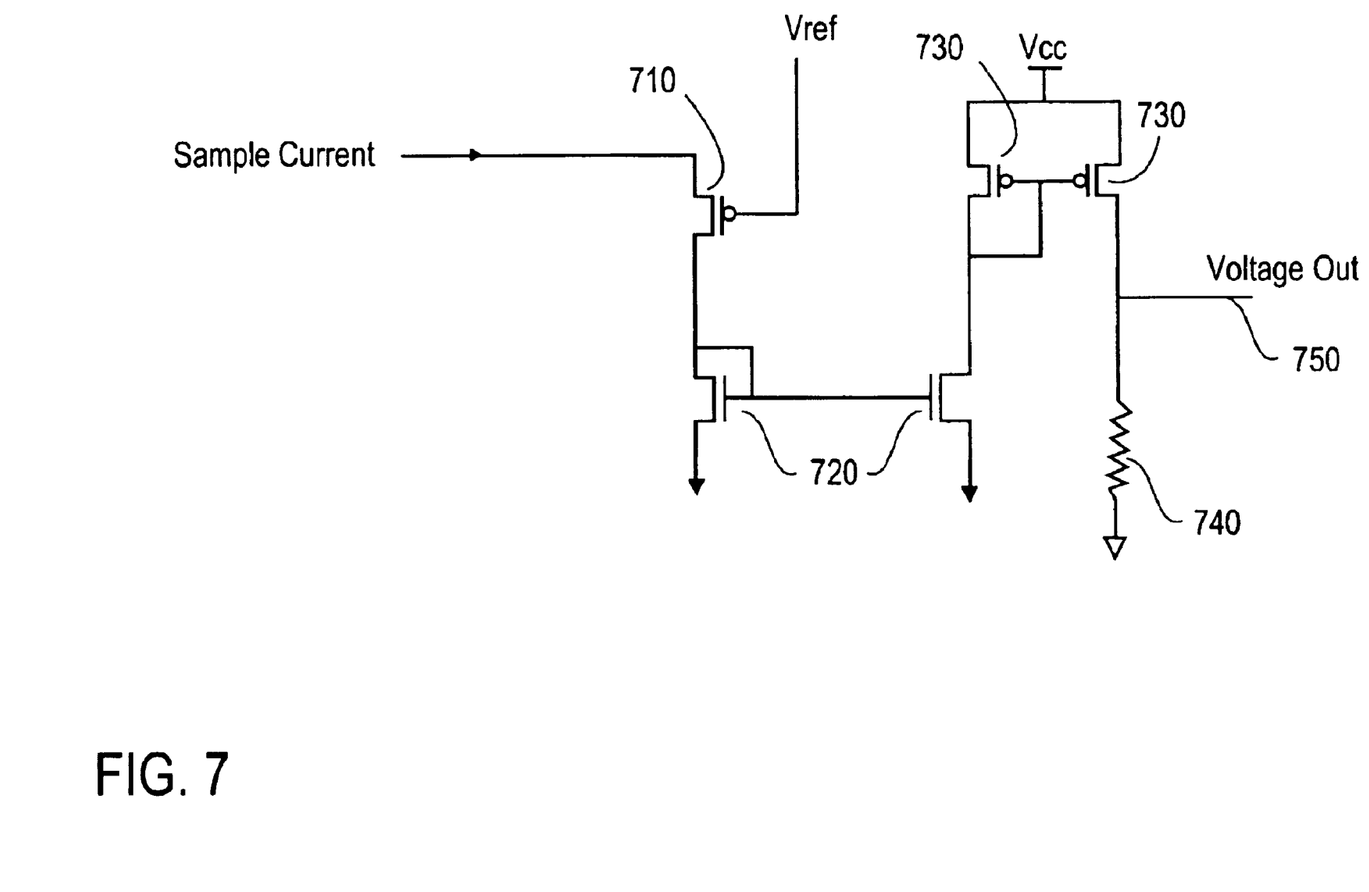
FIG. 7 is a circuit diagram for an exemplary current-to-voltage converter making up the first stage of a double delta sampler circuit.

One embodiment of a first stage of DDSIVC 610 for converting a current signal to a voltage signal is illustrated in FIG. 7. Only the "sample path" is shown, the "calibration path" being essentially identical. Transistor pMOSFET 710 is configured as a follower, where its gate voltage is at some reference voltage, which may be supplied by $V_{ref}$ block 170. After the input current passes through pMOSFET follower 710, it is mirrored across two transistor pairs, 720 and 730, to reorient it to pass it across resistor 740, converting it back to a voltage. Resistor 740 is one quarter the size of resistor 430 in CDS cell 135, and since the current was multiplied by two in the CDS cell via the current mirror pMOSFETs 435, the voltage signal at line 750 is now one half of the voltage signal input to CDS cell 135. The attenuation of one-half is desirable because the signal range from the array column is approximately 3.5V, however the range of DDS 145 and ADC 155 is only 2 V. Therefore, the 1.75 volt range fits well into the signal path. Within DDSIVC 610, this voltage is input to a buffer with low input capacitance and sufficient drive capacity to drive the input of the next stage. This is performed for both the sample and calibration paths. The output of DDSIVC 610 is therefore a quasi-differential voltage such that the calibration voltage signal is always more positive than the sample voltage signal. The output stays quasi-differential through the next few stages.

The next stage in the DDS signal path is DDSCDS2 620. DDSCDS2 620 performs a level shift and programmable gain of the input differential signal. The signals from DDSIVC 620 are referenced to ground, and DDSCDS2 620 shifts them so that the center or common mode voltage is equal to the common mode input voltage VCMI. The gain function is performed with switched capacitor circuits. In a preferred embodiment, the gain is programmable and may be from 1.0 to 8.0. The higher gain values are obtained by using a smaller feedback capacitor in the feedback loop of the switched capacitor circuit. If higher gain values are desired, then it is suggested that the gain be split between the two gain stages.

The input signals to DDSCDS2 620 also contain the dark voltage error. Since the next stages subtract the dark voltage, then changing the DDSCDS2 620 gain value in the middle of a pixel array row will produce a noticeable difference due to the different dark voltages among a pixel array row as well as the different gain setting. Therefore, if it is necessary to change the gain in the middle of a pixel array row, then it is advised that only the gain for the later stage DDSSBG 630 be changed.

Functional block DDSDKST 640 stores the dark column voltage in a sample and hold fashion so that it can be subtracted from the pixel data in the next stage, DDSSBG 630. Each row in pixel array 105 contains a dark pixel near one end of the row. A metal foil extends over the dark pixels. These dark pixels are always kept dark, and consequently no mechanical shutter is required. Furthermore, by using a dark pixel representative of the dark voltage within the entire row containing the dark pixel, it is not necessary to waste a frame to read the dark voltage. In a preferred embodiment, several contiguous pixels in each row are kept dark. However, only one pixel in or near the center of this sub-row of contiguous dark pixels is used to obtain the dark voltage. In this way, a more accurate reading of the dark voltage is obtained because diffracted light is less likely to interfere with a dark pixel near the center of this sub-row of dark pixels.

Dark information is refreshed in DDSDKST 640 during each read of a pixel array row. The combination of DDSDKST 640 and DDSSBG 630 functions to subtract out the dark voltage from the sample voltage signal and the calibration voltage signal. A dark_column signal on line 660 being HIGH indicates that a dark column (i.e., a column corresponding to a dark pixel) is being decoded by MUX 140. If the dark_column signal is HIGH and a dark_enable signal are HIGH on line 650, then during the next clock cycle the signal from DDSCDS2 620 will be stored in DDSDKST 640. If the dark_enable signal is HIGH and the dark_column signal is LOW, then DDSDKST 640 passes the output from DDSCDS2 620 to DDSSBG 630 as well as the stored dark voltage. If the dark_enable is not active, then the dark voltage stored in DDSDKST 640 is short circuited and the signal provided by DDSDKST 640 to DDSSBG 630 is zero.

DDSSBG 630 also uses switched capacitor techniques to subtract the dark voltage from the incoming sample and calibration voltage signals. The quasi differential output of DDSSBG 630 is centered around the common mode voltage (3.0V) and each of its output signals can swing+/−1.0V so that the differential voltage range at this point could be 4.0 volts. However, because it is only quasi-differential it is only 2.0 volts.

This output signals from DDSSBG 630 are finally converted in DDSDC 660, which level shifts the inputs one more time by one-half volt each. The new signals are still centered around VCMI but only swing by +/− one-half volt. This yields a 2.0 volt peak to peak (Vpp) differential signal. This is the required input for one embodiment of ADC 155.

Additionally, DDSDKST 640 may be modified by multiplying the dark voltage by a weighting factor as a function of the pixel column being processed by DDS 145. For example, there may be a temperature gradient along the pixel rows due to row select drivers 120 and shutter/reset drivers 125 being physically placed along the ends of the pixel rows. Consequently, the actual dark voltage for the pixel columns near the center of pixel array 105 may be different than the actual dark voltage at the edges of the pixel arrays. However, only the dark voltages at the edges of the pixel rows are measured. Therefore, when subtracting out the dark voltages stored in DDSDKST 640, they may first be multiplied by a weighting factor to account for the temperature gradient.

The differential output of DDS 145 is the input to ADC 155. ADC 155 contains analog and digital sections. ADC 155 uses a pipelined architecture. The analog sections produces skewed digital outputs that are realigned and corrected by the digital logic. The analog pipeline is comprised of serial analog cells or blocks. Each of these blocks perform part of the conversion, subtracts that result from the input, and multiplies this new value by a constant. This product is a new value that is sent to the next stage as input. The digital result of the conversion is sent to the digital correction block. Each of the analog cells perform part of the conversion. The clocking for the cells alternates so that the transfers are pipelined. The clocking is two phase. In one phase the cells sample the input, and perform analog-to-digital conversion. In the next clock phase the cells perform digital-to-analog conversion and multiplication. When one cell is sampling the next adjacent cell is multiplying. Therefore the clocking of cells alternates for each of the cells. This also provides a half cycle delay per stage. Because of the delay, all of the data is skewed going to the digital section and must be realigned.

Analog-to-digital conversion is performed in the first half of a clock cycle, called sample, then the digital-to-analog conversion, summing, and amplification are all performed in the last half of the clock cycle, called multiply. In one embodiment, the actual implementation is done with switched capacitor techniques, an amplifier, comparators, and digital logic. The amplifier and switched capacitor use a MDAC technique to perform the multiplication.

Other embodiments for DDS 145 and ADC 155 may be realized. The overall combined function of DDS 145 and ADC 155 is to (i) convert the sample and calibration current signals to sample and calibration voltage signals, (ii) store the dark voltage signals for each frame, (iii) dark correct the sample and calibration voltage signals base upon the dark voltage signals for the pixel row being processed to obtain dark corrected sample and calibration voltage signals, (iv) process the dark corrected sample voltage signals and dark corrected calibration voltage signals to obtain an image voltage signal representative of the time integration of light intensity incident upon the pixel being processed, and (v) digitize the image voltage signal. Clearly, other embodiments may be realized for performing this combined function of DDS 145 and ADC 155 without departing from the scope of the invention as claimed below. For example, the dark voltage signals may be subtracted from the sample and calibration voltage signals in the digital domain after analog-to-digital conversion. Furthermore, subtraction of the dark corrected sample voltage signal from the dark corrected calibration voltage signal may also be done in the digital domain. Also, the dark voltages may be subtracted after the sample voltage signal is subtracted from the calibration voltage signal. For example, if $D_s$ and $D_c$ are the dark voltage signals for the sample and calibration voltage signals, respectively, and if $X_s$ and $X_c$ are the sample and calibration voltage signals, respectively, then for infinite precision the expression $(X_c-D_c)-(X_s-D_s)$, which is the dark corrected sample voltage signal subtracted from the dark corrected calibration voltage signal, is equal to $(X_c-X_s)-(D_c-D_s)$. However, because analog and digital processing is never exact, different implementations for practical circuits and finite precision will result depending upon the order of the subtractions and where in the signal path analog-to-digital conversion takes place.

Furthermore, other embodiments for the functional blocks illustrated in FIG. 1 may be realized, and indeed, other architectures than that illustrated in FIG. 1 may be realized, without departing from the scope of the invention as claimed below. For example, the calibration voltage signals need not be updated every frame, and may be stored in a memory circuit for inter-frame processing. Furthermore, CDS cells 135 need not have separate sample and calibration paths, but may use time-multiplexing with one path for both sample and calibration current signals. Similarly for MUX 140. Furthermore, CDS 130 need not have a dedicated CDS cell for each pixel column, but may use fewer CDS cells with multiplexing. Clearly, different tradeoffs are possible. As another example of a different architecture, a plurality of dark pixels for each pixel row may be used to obtain information about the dark voltage, where the dark voltages for this plurality of dark pixels are averaged to obtain a better estimate of dark voltage. Also, this plurality of dark pixels in each pixel row need not be contiguous. For example, half may be placed on one edge of a pixel row, and half on the other edge.

What is claimed is:

1. An image sensor comprising:
   a plurality of pixel rows pixel_row(i), i=1,2, . . . , n, wherein each pixel row comprises a plurality of pixel circuits;
   wherein each pixel circuit cornprises:
      a pixel diode;
      a reset switch coupling the pixel diode to a bias voltage circuit so as to reverse bias the pixel diode only if ON;
      a capacitor;
      a shutter switch coupling the capacitor to the pixel diode so that a voltage drop across the capacitor is responsive to a voltage drop across the pixel diode only if the shutter switch is ON;
      a transistor follower connected to the capacitor to provide a voltage signal that follows the voltage drop across the capacitor; and
      a row select switch coupled to the transistor follower;
   the sensor further comprising:
      a plurality of column lines column_line(j), j=1,2, . . . , m, wherein for each i=1,2, . . . , n, for each j=1,2, . . . , m, column_line(j) is connected to pixel circuit pixel_circuit(i,j) belonging to the plurality of pixel circuits within pixel_row(i) via the row select switch of pixel_circuit(i,j), where for each i=1,2, . . . , n, for each j=1,2, . . . , m, pixel_circuit (i,j) is to provide on column_line(j) a calibration voltage signal calibration_voltage(i,j) equal to the voltage signal provided by pixel_circuit(i,j) only if the reset switch, the shutter switch, and row select switch for pixel_circuit(i,j) are ON, and a sample voltage signal sample_voltage(i,j) equal to the voltage signal provided by pixel_circuit(i,j) only if the reset switch and shutter switch for pixel_circuit(i,j) are OFF and the row select switch for pixel_circuit (i,j) is ON; and
      an opaque layer deposited proximal to the plurality of pixel rows so that for each i=1,2, . . . , n, a set dark_pixel_set(i) of at least one pixel circuit belonging to pixel_row(i) is permanently dark.

2. The sensor as set forth in claim 1, further comprising:
   a voltage-to-current converter circuit, comprising cells cell(j),j=1,2, . . . , m, coupled to the plurality of column lines, wherein for each i=1,2, . . . , n, for each j=1,2, . . . , m, each cell (j) is to provide a calibration current signal calibration_current(i,j) indicative of calibration_voltage(i,j) and a sample current signal sample_current(i,j) indicative of sample_voltage(i,j).

3. The sensor as set forth in claim 2, further comprising:
   a switching circuit coupled to the voltage-to-current converter circuit;
   a current-to-voltage converter circuit coupled to the switching circuit, the switching circuit to multiplex for each j=1,2, . . . , m, for each i=1,2, . . . , n, calibration_current(i,j) and sample_current(i,j) in serial fashion to the current-to-voltage converter circuit, the current-to-voltage converter to provide for each i=1,2, . . . , n, for each j=1,2, . . . , m, a new sample voltage signal new_sample_voltage(i,j) indicative of sample_current(i,j) and a new calibration voltage signal new_calibration_voltage(i,j) indicative of calibration_current(i,j).

4. The sensor as set forth in claim 3, wherein the current-to-voltage converter comprises a MOSFET coupled to the switching circuit so that the sample current signals substantially pass through the source drain channel of the MOSFET only if ON, wherein the gate of the MOSFET is connected to a voltage supply circuit.

5. The sensor as set forth in claim 4, further comprising a first processor circuit connected to the current-to-voltage converter circuit to store for each i=1,2, . . . , n, a dark sample voltage signal dark_sample_voltage(i) indicative of the set {new_sample_voltage(i,j): j∈Δ(i)}, where Δ(i) is the set {j: pixel_circuit(i,j)∈ dark_pixel_set(i)}, and to store a dark calibration voltage signal dark_calibration_voltage(i) indicative of the set {new_calibration_voltage(i,j): j∈Δ(i) }.

6. The sensor as set forth in claim 5, further comprising a second processor circuit connected to the first processor circuit to, for each i=1,2, . . . , n, for each j=1,2, . . . , m, process dark_sample_voltage(i) and new_sample_voltage(i,j) to obtain a dark corrected sample voltage signal dark_corrected_sample_voltage(i,j), and process dark_calibration_voltage(i) and new_calibration_voltage(i,j) to obtain a dark corrected calibration voltage signal dark_corrected_calibration_voltage(i,j).

7. The sensor as set forth in claim 6, further comprising a third processor circuit connected to the second processor circuit to, for each i=1,2, . . . , n, for each j=1,2, . . . , m, provide a dark corrected image voltage signal substantially proportional to the voltage difference between dark_corrected_sample_voltage(i,j) and dark_corrected_calibration_voltage(i,j).

8. The sensor as set forth in claim 7, further comprising a pipelined analog-to-digital converter to digitize the dark corrected image voltage signals.

9. The sensor as set forth in claim 8, wherein the plurality of pixel rows, the voltage-to-current converter circuit, the switching circuit, the current-to-voltage converter circuit, and the first, second, and third processor circuits are integrated on a single die.

* * * * *

UNITED STATES PATENT AND TRADEMARK OFFICE
CERTIFICATE OF CORRECTION

PATENT NO. : 6,747,695 B1
DATED : June 8, 2004
INVENTOR(S) : Afghahi

It is certified that error appears in the above-identified patent and that said Letters Patent is hereby corrected as shown below:

Column 9,
Line 34, delete "cornprises" and insert -- comprises --.

Signed and Sealed this

Twenty-first Day of September, 2004

JON W. DUDAS
*Director of the United States Patent and Trademark Office*